Figure 1:
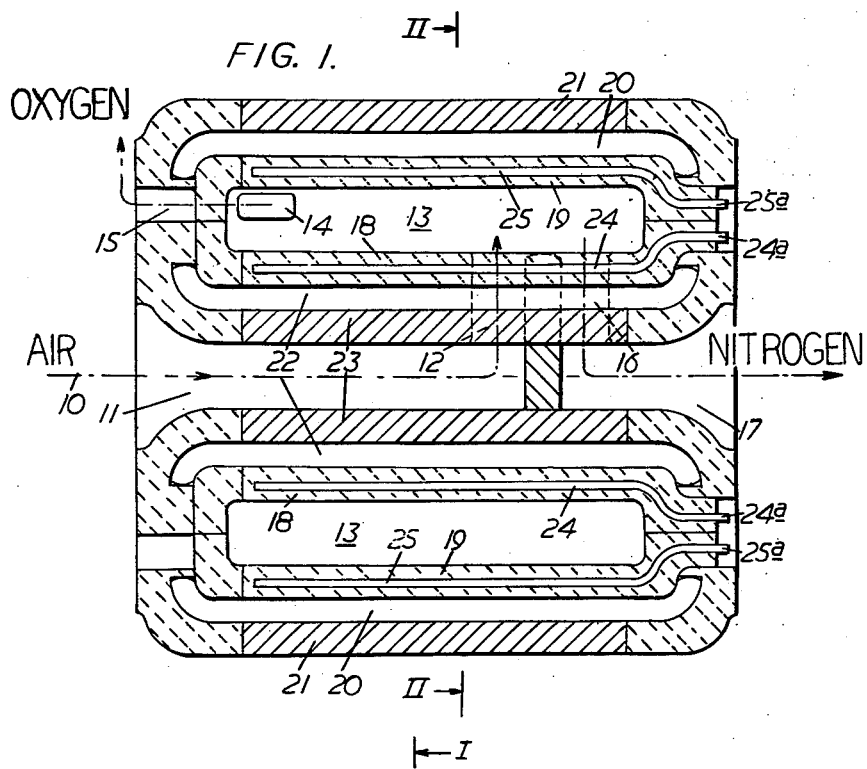

Oct. 16, 1962   N. S. JAPOLSKY   3,059,110
SEPARATION OF GAS MIXTURES
Filed July 30, 1959   2 Sheets-Sheet 1

Inventor
Nicholas Japolski
By
Aaron R. Townshend
Attorney

Oct. 16, 1962  N. S. JAPOLSKY  3,059,110
SEPARATION OF GAS MIXTURES
Filed July 30, 1959  2 Sheets-Sheet 2
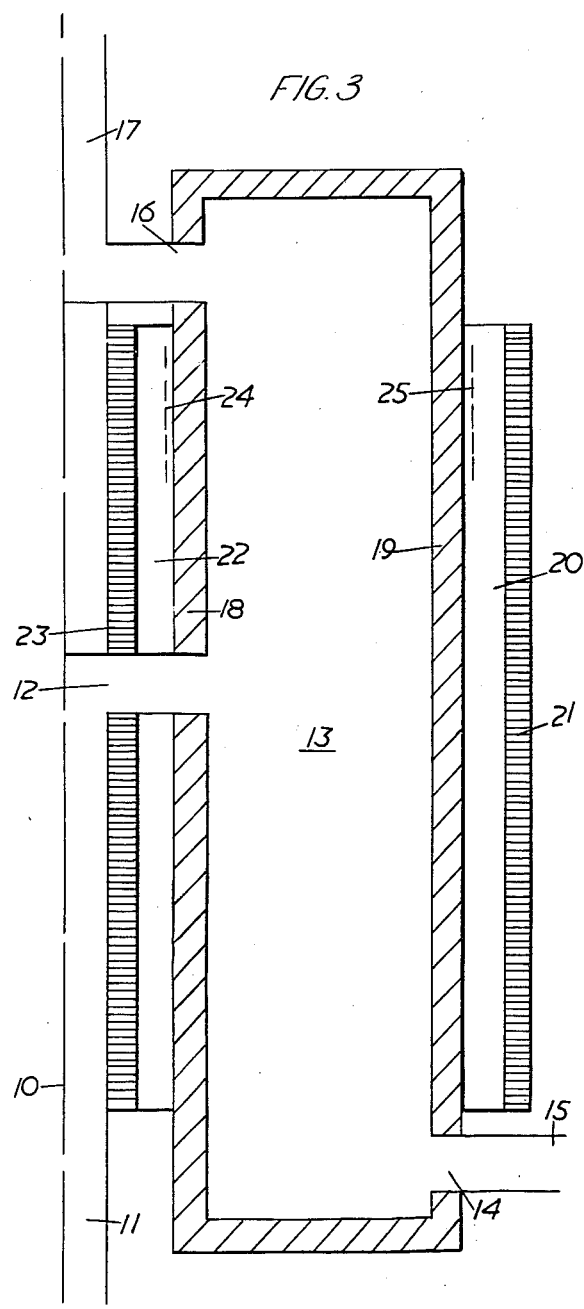
Inventor
NICHOLAS S. JAPOLSKY
By
Aaron R. Townshend Attorney 3,059,110
SEPARATION OF GAS MIXTURES
Nicholas S. Japolsky, Highgate, London, England, assignor to The British Oxygen Company Limited, a British company
Filed July 30, 1959, Ser. No. 833,121
Claims priority, application Great Britain July 31, 1958
2 Claims. (Cl. 250—41.9)

This invention relates to a method of and apparatus for the separation of a gas mixture into a lighter and a heavier fraction, for example the separation of air into two fractions, one enriched in oxygen and the other enriched in nitrogen.

In accordaince with one aspect of the invention, in a process for the separation of a gas mixture into a heavier and a lighter fraction by rotary movement of the gas about an axis produced by the combined action on ionised gas of a travelling electric field and a travelling magnetic field, the separated fractions are withdrawn from opposite ends of a space extending along and about the axis and in which the separation takes place. The separation space may be cylindrical or preferably annular in shape.

The principal function of the travelling electric field is to ionise the gas and thereby to permit a current to flow through it, while that of the travelling magnetic field in conjunction with the electric field is to produce the force moving the ionised gas about the axis, by the interaction between the magnetic field and the current in the ionised gas; the ionised gas acting like a conductor in which a current is flowing. As the ionised gas moves about the axis, the centrifugal force acting upon it produces in the components of the gas mixture of different density, due to a difference in atomic or molecular weights, a tendency to separate, those of greater density tending to concentrate at the periphery of the separation space and those of smaller density nearer to the axis. Thus the flow of the heavier components towards one end of the space will take place at the outer periphery of the space whilst that of the lighter components to the other end of the space will proceed at a zone in the space nearer to the axis.

In order to accentuate the tendency to separation of the heavier and lighter components, their movement towards opposite ends of the space can be assisted by adding longitudinal cmponents to the rotary motion of the travelling fields so as to produce a force acting on the ionised gas which not only causes the gas to rotate about the axis but also acts to give the heavier and lighter components a motion in opposite directions parallel to the axis, so that the heavier and lighter components follow generally helical paths in opposite axial directions through the space. When fractions are withdrawn from opposite ends of the space, one of the fractions will thus be enriched in the heavier components and the other in the lighter components.

According to another aspect of the invention, apparatus for the separation of a gas mixture into a heavier and a lighter fraction comprises walls defining a space extending along and about an axis, means for producing travelling electric and magnetic fields in the space moving about the axis, intakes for introducing the gas mixture into the space at a point intermediate its ends and outlets for withdrawing separated heavier and lighter fractions from opposite ends of the space.

Figure 2:
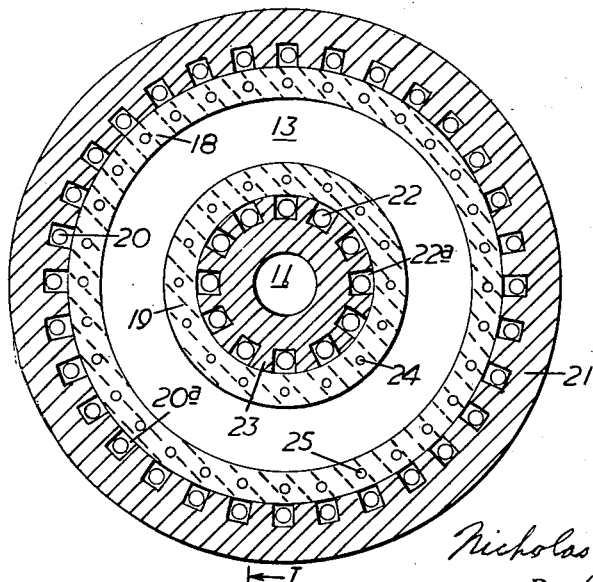

The invention will now be more particularly described with reference to the accompanying drawings in which FIGURE 1 is a sectional side elevation of apparatus according to the invention suitable for the separation of air into an oxygen-enriched and a nitrogen-enriched fraction; and FIGURE 2 is a sectional view of the apparatus of FIGURE 1 along the line II—II.

FIGURE 3 is another view of the apparatus according to the invention.

The arrangement of apparatus shown in the drawing is generally symmetrical about an axis 10. Air to be separated is delivered from one end through a pipe 11 to a series of intake ports 12 which allow the air to enter an annular space 13 at a point intermediate its ends. After separation, the components of the air are delivered to separate outlets, an oxygen-rich fraction being delivered through a series of outlets ports 14 at one end of the annular space 13 to an outlet pipe 15 and a nitrogen-rich fraction being delivered through a series of outlet ports 16 at the other end of the annular space to an outlet pipe 17.

The annular space 13 is bounded on the inside by a wall 18 and on the outside by a wall 19, both walls being made of a refractory and electrically-insulating material such as a ceramic material. The air admitted through the ports 12 into the annular space 13 is ionised and caused by means described hereafter to circulate about the axis 10 at high speed. The speed at the outer wall 19 may be of the order of 1000 metres per second or even higher. This circulation of the air is produced by a combination of magnetic and electric fields which are caused to travel in the annular space 13. The magnetic fields are produced by an arrangement of conductors generally similar to those of the stator winding of an induction motor. These windings indicated diagrammatically in the drawing at 20 are mounted in slots 20a in magnetic material 21 forming a shell surrounding the outer wall 19 of the annular space. As indicated in the drawing, similar windings 22 mounted in slots 22a in magnetic material 23 are provided within the inner wall 18. The windings 20 and 22 are energised with alternating current, the frequency of which is preferably somewhat higher than normal power frequencies. For example, the frequency may be of the order of 200 to 1000 cycles depending upon the size of the apparatus. While the windings 20 and 22 can be fed with single phase or three phase alternating current at the frequency above mentioned, it is preferable that they should be fed with polyphase current, for example with 12 phase alternating current. As in alternating current motors, it is desirable that the windings 20 and 22 should be carried in slots in the magnetic material 21 and 23 respectively which are skewed in relation to any plane passing through the axis, the skewing of the inner windings being in the opposite direction to that of the outer windings.

In addition to the windings 20 and 22 for producing the magnetic fields rotating about the axis 10, there are also provided further conductors indicated at 24 and 25 respectively, housed within the insulating walls 18 and 19 respectively. Each of the conductors 24 is connected at one end 24a to one terminal of a high frequency alternating current supply, and each of the conductors is similarly connected at one end 25a. Because each of the conductors 24 and 25 has only a single connection to it, the conductor will function as an electrode and the field produced will be predominantly electric in character; the magnetic component thereof will be negligible. This electric field must be of sufficient intensity to produce a corona effect so as to ionise the gas in the annular space 13 to an extent sufficient to ensure its adquate conductivity. Depending upon the requirements of the particular design of apparatus, the optimum maximum intensity of the electric field may be as high as 10,000 volts per cm. or even higher. Preferably the conductors 24 and 25 are fed with polyphase electric current so that they produce what is in effect an electric field which rotates about the axis 10. One advantage of using polyphase supplies for feeding the conductors 24 and 25 is that there will be a more gradual variation in the electric field around the axis 10. Owing to the skewing of the windings and conductors, rotation of the magnetic and electric fields imparts to the gas entrained by the fields a helical motion having two components. The first component is a rotation about the axis and gives rise to a centrifugal force which causes the heavier fraction to concentrate at the outer periphery of the separation space and the lighter fraction to concentrate at the inner periphery thereof. The second component of motion imparted to the entrained gas by the rotating fields is a translatory motion parallel to the axis, and since the inner and outer windings and conductors are skewed in opposite directions, the translatory motion imparted to the heavier fraction at the outer periphery of the separation space will be opposite in direction to that imparted to the lighter fraction at the inner periphery. The heavier fraction will therefore tend to follow a spiral path towards the outlet at one end of the separation space, while the lighter fraction will tend to spiral towards the outlet at the other end of the space. These spiral motions of the heavier and lighter fractions supplement the natural diffusional flow of the two fractions to opposite ends of the separation space occasioned by the mere fact of having outlets at opposite ends of the separation space remote from the intermediate gas inlet, and therefore increase the efficiency of the separation of the two fractions.

While the frequency of the electric current used to produce the magnetic field may be the same as that used for producing the electric field in the annular space 13, this is not essential and, if desired, different frequencies may be used. If the same frequency is used, it may be advantageous to provide means for adjusting the phase relationship between the electric and magnetic field.

The fractions withdrawn through the outlet pipes 15 and 17 respectively will still possess considerable rotary motion and this may be utilised to generate electric power. The rotating fraction is passed through a rotating magnetic field produced by windings similar to those shown at 20 and 22 and connected to a high frequency polyphase A.C. supply. The magnetic field is arranged to travel with a velocity less than that of the rotating product so that there is a "slip" between the ionised particles and the field. There is therefore an action comparable to that of a polyphase electrical induction generator and part of the kinetic energy of the rotating gas is returned to the winding in the form of electrical energy.

While the invention has been particularly described with reference to the separation of air, it will be appreciated that it may be applied to the separation of other gas mixtures, such as, for example, a mixture of hydrogen and nitrogen, or a mixture of hydrogen and carbon monoxide and dioxide. It may also be applied to the separation of a mixture of oxygen and argon in which the respective molecular weights of the components are 32 and 40.

I claim:
1. Apparatus for the separation of a gas mixture into a heavier and a lighter fraction comprising an inner wall and an outer wall of refractory and electrically-insulating material together defining an annular space extending along and about an axis, means for producing travelling electric and magnetic fields moving within said space about said axis, an intake for introducing said gas mixture into said space at a point intermediate its ends, and outlets for withdrawing separated heavier and lighter fractions from opposite ends of said space, said means for producing a travelling electric field comprising conductors mounted in both said inner and said outer walls and means for feeding said conductors with an alternating potential, and said means for producing a travelling magnetic field comprising conductors associated with magnetic material surrounding said outer wall and optionally mounted within said inner wall, said conductors producing the travelling magnetic field being skewed in relation to a plane passing through said axis.

2. Apparatus according to claim 1 wherein said conductors producing the travelling electric field are skewed in relation to any plane passing through said axis.

References Cited in the file of this patent
UNITED STATES PATENTS

| | | |
|---|---|---|
| 1,123,867 | Gue | Jan. 5, 1915 |
| 1,417,189 | McCarthy | May 23, 1922 |
| 1,546,632 | Dow et al. | July 21, 1925 |
| 1,553,737 | Allingham | Sept. 15, 1925 |
| 1,700,928 | Fawhes | Feb. 5, 1929 |
| 1,865,425 | Bartling | July 5, 1932 |
| 2,507,653 | Smith | May 16, 1950 |
| 2,533,966 | Simmons | Dec. 12, 1950 |
| 2,724,056 | Slepian | Nov. 15, 1955 |